(12) United States Patent
Kasliwal

(10) Patent No.: US 9,090,013 B2
(45) Date of Patent: Jul. 28, 2015

(54) DUAL SCREW EXTRUSION APPARATUS HAVING A MIXING CHAMBER AND A CONVEYING CHAMBER DOWNSTREAM THEREOF WITH THE MIXING CHAMBER HAVING A WALL CLEARANCE GREATER THAN THAT OF THE CONVEYING CHAMBER

(76) Inventor: Shashank Gulabchand Kasliwal, Maharashtra (IN)

( * ) Notice: Subject to any disclaimer, the term of this patent is extended or adjusted under 35 U.S.C. 154(b) by 1044 days.

(21) Appl. No.: 12/403,686

(22) Filed: Mar. 13, 2009

(65) Prior Publication Data

US 2009/0175118 A1 Jul. 9, 2009

Related U.S. Application Data

(62) Division of application No. 11/739,231, filed on Apr. 24, 2007, now abandoned.

(51) Int. Cl.
*B29C 47/40* (2006.01)
*B29C 47/60* (2006.01)
*B29C 47/38* (2006.01)
*B29C 47/10* (2006.01)
(Continued)

(52) U.S. Cl.
CPC ........... *B29C 47/402* (2013.01); *B29C 47/0004* (2013.01); *B29C 47/1063* (2013.01); *B29C 47/38* (2013.01); *B29C 47/6012* (2013.01); *B29C 47/6056* (2013.01); *B29C 47/0009* (2013.01); *B29C 47/767* (2013.01)

(58) Field of Classification Search
CPC .................... B29C 47/50; B29C 47/6012

USPC .................. 366/75, 79–91; 425/200–209; 403/359.1–359.6
See application file for complete search history.

(56) References Cited

U.S. PATENT DOCUMENTS 3,143,767 A * 8/1964 Wirth et al. .................. 366/85
3,638,455 A * 2/1972 Francois ....................... 464/181
3,917,507 A * 11/1975 Skidmore ...................... 159/2.2
(Continued)

FOREIGN PATENT DOCUMENTS

DE 33 48 324 C1 4/1990
JP 02120006 A * 5/1990 ............... B29B 7/48
WO WO 2007033328 A2 * 3/2007

OTHER PUBLICATIONS

Aufbereitung des Kunststoff-Rohstoffs, Dipl.-Ing. Heinz Herrmann, Stuttgart, Carl Hanser Verlag, Munchen 1985.
(Continued)

*Primary Examiner* — Charles Cooley
(74) *Attorney, Agent, or Firm* — John B. Hardaway, III; Nexsen Pruet, LLC

(57) ABSTRACT

An extrusion apparatus including a mixing chamber comprising two intersecting housing bores and an inlet positioned to receive material into the mixing chamber. Two screw shafts are supported for rotation about respective generally parallel axes and include respective screw sections positioned for co-wiping intermeshing rotation within the respective housing bores of the mixing chamber. The apparatus supports screw shaft rotational speeds greater than approximately 800 rpm and includes screw shaft conveying portions that are rotatably cantilevered for self-journaled support within respective separate conveying chambers arranged generally parallel to one another downstream of the mixing chamber.

10 Claims, 5 Drawing Sheets

(51) Int. Cl.
  *B29C 47/00* (2006.01)
  *B29C 47/76* (2006.01)

(56) References Cited

U.S. PATENT DOCUMENTS

| | | | | |
|---|---|---|---|---|
| 3,963,558 | A * | 6/1976 | Skidmore | 159/2.2 |
| 3,985,348 | A * | 10/1976 | Skidmore | 366/75 |
| 3,993,292 | A * | 11/1976 | Skidmore | 366/87 |
| 4,100,244 | A * | 7/1978 | Nonaka | 264/211 |
| 4,113,822 | A | 9/1978 | Takiura et al. | |
| 4,162,854 | A * | 7/1979 | Ullrich | 366/83 |
| 4,279,275 | A * | 7/1981 | Stanwood et al. | 138/109 |
| 4,645,445 | A * | 2/1987 | Takanashi | 425/208 |
| 4,707,139 | A | 11/1987 | Valenzky et al. | |
| 4,807,351 | A * | 2/1989 | Berg et al. | 29/432 |
| 4,826,323 | A * | 5/1989 | Loomans et al. | 366/85 |
| 4,875,796 | A * | 10/1989 | Storm | 403/359.6 |
| 5,304,000 | A | 4/1994 | Kowalczyk et al. | |
| 5,304,012 | A * | 4/1994 | Wendling | 403/274 |
| 6,036,630 | A | 3/2000 | Robey | |
| 6,042,260 | A * | 3/2000 | Heidemeyer et al. | 366/83 |
| 6,162,162 | A | 12/2000 | Robey | |
| 6,958,128 | B2 * | 10/2005 | Gates et al. | 264/211.21 |
| 6,997,596 | B1 * | 2/2006 | Eigruber | 366/81 |
| 2003/0206482 | A1 * | 11/2003 | Griggs | 366/81 |
| 2005/0111294 | A1 * | 5/2005 | Gates et al. | 366/81 |
| 2008/0267003 | A1 * | 10/2008 | Kasliwal | 366/85 |
| 2009/0175118 | A1 * | 7/2009 | Kasliwal | 366/85 |

OTHER PUBLICATIONS

Integrating Compounding and Reacting with Finished Products Extrusion, W. Thiele and J. Biesenberger, American Leistritz Extruder Corp., Styrenics RETEC, Feb. 27-28, 1995, Dall.
World Compounding Congress, AMI's International Conference for the Thermoplastic Compounding Industry, Swissotel Rheinpark, Neuss, Germany.
Entscheidung der Technischen Beschwerdekammer 3.2.5 vom Jan. 20, 2004.
Kunststofftechnik, Der Doppelschneckenextruder—Grundlagen und Anwendungsgebiete, Apr. 1994.
Kunststofftechnik, Der Doppelschneckenextruder—Grundlagen und Anwendungsgebiete.
Leistritz, Maschininfabrik GmbH, Nurnberg, Germany, Leistritz Zweischnecken Extruder, Baureihe ZSE—Technische Daten.
Leistritz Extrusionstechnik.
Leistrititz Extrusionstechnik, Die neue, Star-Compounder-Baureihe ZSE.
Kunststofftechnik, Technische Daten, ZSK.
Text 1: Kunststoffe—ein Werkstoff macht Karriere.
Text 2: Auf dem Weg zur flexiblen und Intelligenten Aufbereitungsanlage.
The Theysohn Compounder, technical data.
Der Compounder TSK (Theysohn), technical data.
Evaluating Extrusion Models for Scale-up the Twin-Screw Compounding Process, M.H. Mack, Berstorff Corporation, Compounding '95 Conference, Philadelphia, PA.
Handbuch der Kunststoff-Extrusionstechnik II Extrusionsanlagen, Herausgegeben von Prof. Dr. F. Hensen, Prof. Dr. W. Knappe und Prof. Dr. H. Potente, Mit 708 Bildern und 84 Tab.
Berstorff Kunststoff, K'95 Press Release, Newly developed ZE Twinscrew Extruder.
International Search Report for PCT/EP96/03531, Dec. 17, 1996.
Japan Plastics, Bimonthly issue/vol. 9, No. 1/Jan.-Feb. 1975, "Investigation of Ultra-High Speed Extruder Based on Entirely New Design Concept".
Kunststoffe, Verarbeitung und Anwendung, Betriebsverhalten und Praxisergebnisse von schnellaufenden Schneckenpressen, Von Ing. Erich Beck.
Processing, New concepts spur development of ultra-high-speed extrusion, G.A. Kruder and R.E. Ridenhour, HPM Corp. Mount Gilead, Ohio.
International Search Report for PCT/EP96/03531, dated Dec. 9, 1996.
WIPO document dated Jan. 12, 1998 for PCT/EP96/03531.
Kunststofftechnik, Der Doppelschnecken-extruder, Grundlagen und Anwendungsgebiete.
Kunststofftechnik entitled "Increasing Output in Co-Rotating Twin-Screw Extruders".
English Translation of DE 33 48 324 C1 entitled "Method of Achieving a Maximum Output from a Twin-Screw Extruder".
Kunststoffe 75 (1985) 2.
Excerpts from publication entitled "Introduction to Plasticating Extrusion".
Cover sheet from International Search Report for PCT/EP96/03531.

* cited by examiner

DUAL SCREW EXTRUSION APPARATUS HAVING A MIXING CHAMBER AND A CONVEYING CHAMBER DOWNSTREAM THEREOF WITH THE MIXING CHAMBER HAVING A WALL CLEARANCE GREATER THAN THAT OF THE CONVEYING CHAMBER

This application is a divisional application of U.S. Ser. No. 11/739,231, filed on Apr. 27, 2007, "now abandoned."

BACKGROUND OF THE INVENTION

1. Field of the Invention

This invention relates generally to a method and apparatus for forming an extrudate.

2. Description of the Related Art Including Information Disclosed Under 37 CFR 1.97 and 1.98

It is known to form an extrudate using an extruder that includes a housing having a mixing chamber defined by a pair of parallel intersecting housing bores, and a pair of screw shafts supported for rotation about respective generally parallel axes and including respective screw sections positioned for co-wiping intermeshing rotation within the respective housing bores of the mixing chamber. A drive mechanism is operably attached to the screw shafts and rotates the screw shafts in the same direction and in the same sense.

For example, U.S. Pat. No. 6,042,260 issued 28 Mar. 2000 to Heidemeyer et al., discloses an extruder that includes a pair of screw shafts supported for rotation in a housing and including respective screw sections positioned for co-wiping intermeshing rotation within respective housing bores of a mixing chamber in the housing. The screw sections each have an outside diameter to inside diameter (OD-ID) ratio of "greater than or equal to" 1.55. A drive mechanism rotates screw shafts are rotated in the same direction and in the same sense at rotational speeds of "at least" 800 rpm and at a torque density of "at least" 11 $Nm/cm^3$). To support the screw shaft for rotation, the screw sections of the screw shafts and the housing bores are sized to leave only a small screw-to-chamber wall clearance, i.e., a small gap between the screw sections of the screw shafts and the respective housing bores of the mixing chamber. However, such a small tolerance can result in significant shear heating in the vicinity of the screw sections—especially at shaft rotation speeds in excess of 800 rpm.

What would be desirable would be an extruder designed to reduce shear heating in the vicinity of the screw sections to acceptable levels, even at shaft rotation speeds in excess of 800 rpm.

BRIEF SUMMARY OF THE DISCLOSURE

An extrusion apparatus is provided for forming an extrudate. The apparatus includes a mixing chamber comprising two parallel intersecting housing bores and two screw shafts supported for rotation about respective generally parallel axes and including respective screw sections positioned for co-wiping intermeshing rotation within the respective housing bores of the mixing chamber. The apparatus is configured to support screw shaft rotational speeds greater than approximately 800 rpm. The screw shafts also include respective conveying portions rotatably cantilevered for self-journaled support within respective separate conveying chambers arranged generally parallel to one another downstream of the mixing chamber. This self-journaled support arrangement reduces shear heating in the vicinity of the screw sections by allowing for a larger screw-to-chamber wall clearance in the mixing chamber.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 1:
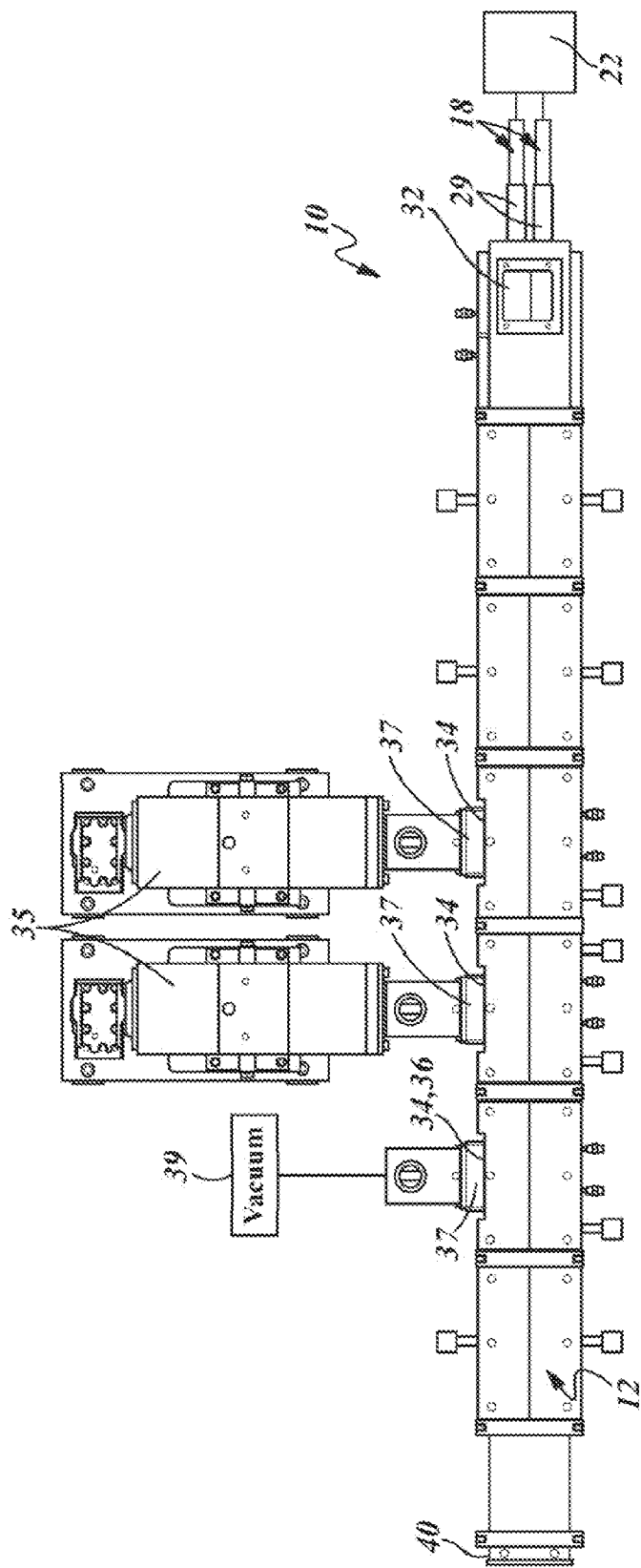
FIG. 1 is a top view of a twin-screw extruder constructed according to the invention and with two side feeders and a de-gassing port connected and in communication with a mixing chamber of the extruder.
Figure 2:
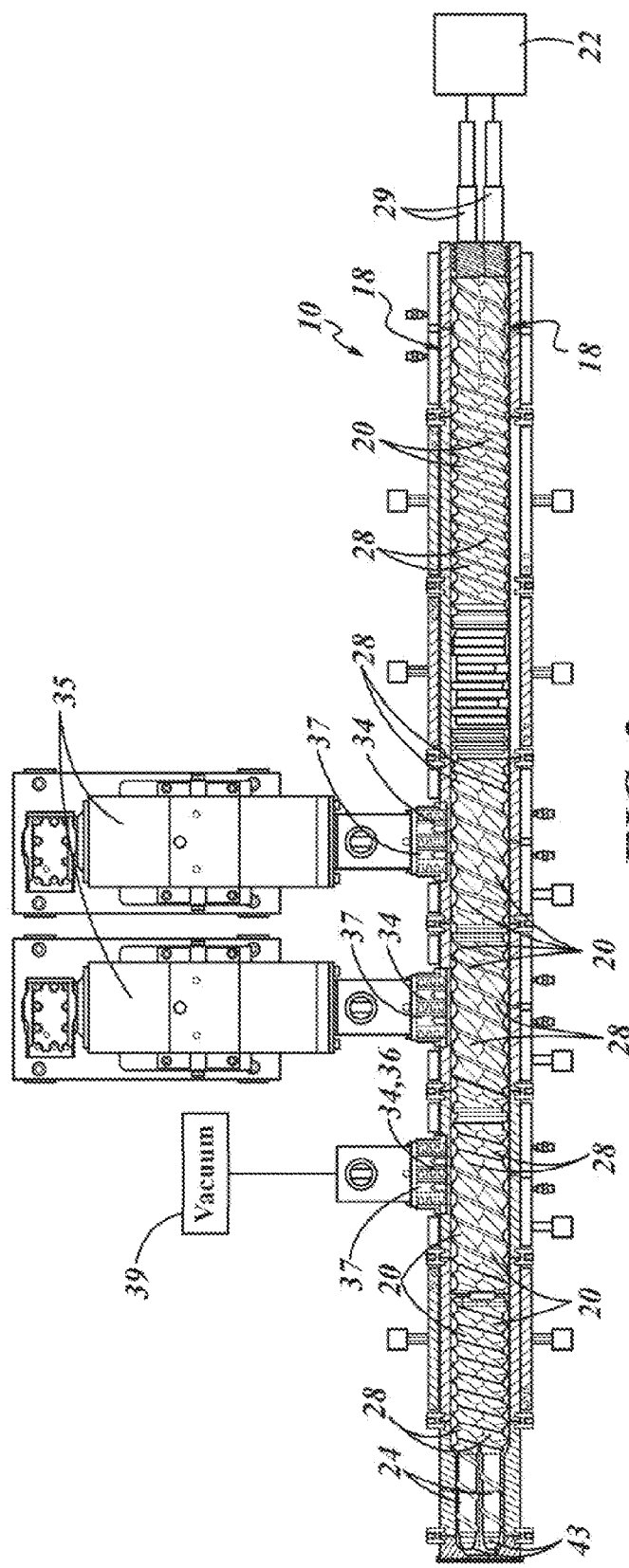
FIG. 2 is a partial cross-sectional view of the twin-screw extruder of FIG. 1.

An apparatus for forming an extrudate is generally shown at 10 in the drawings. The apparatus 10 may include a housing 12 including a mixing chamber 14 comprising two parallel generally cylindrical intersecting housing bores 16. Two screw shafts 18 are supported for rotation about respective generally parallel axes and include respective screw sections 20 positioned for co-wiping intermeshing rotation within the respective housing bores 16 of the mixing chamber 14. A drive mechanism 22 is operably attached to the screw shafts 18 and is actuable to rotate the screw shafts 18 in the same direction and in the same sense at rotational speeds in the range of approximately 100 to 1800 rpm. The drive mechanism 22 may be of any suitable model and may be obtained from any one of a number of different manufacturers including Flender Antriebstechnik, Eisenbeiss GmbH, Zambello Riduttori, P.I.V., and Thyssen Henschel Power Transmission.

Operating in the high end of this rotational speed range can lead to significant shear heating in the vicinity of the screw sections 20 to the potential detriment of extrudate that the apparatus 10 is producing. Therefore, to reduce shear heating by allowing for greater clearance between the screw shaft screw sections 20 and the housing bores 16, while at the same time supporting screw shaft rotational speeds greater than approximately 800 rpm, the screw shafts 18 include respective conveying portions 24 rotatably cantilevered for self-journaled support within respective separate tubular conveying chambers 26 that are arranged generally parallel to one another downstream of the mixing chamber 14. This cantilevered self-journaled support also minimizes shaft sag and, consequently, internal wear and tear associated with shaft sag. The basic structure of twin screw extruders having downstream conveying chambers and screw shaft conveying portions is disclosed in U.S. Pat. Nos. 3,195,868; 4,752,135; and 5,439,286; and PCT International Patent Application No. PCT/US2006/035855; all of which are incorporated herein by reference in their entirety.

Figure 3:
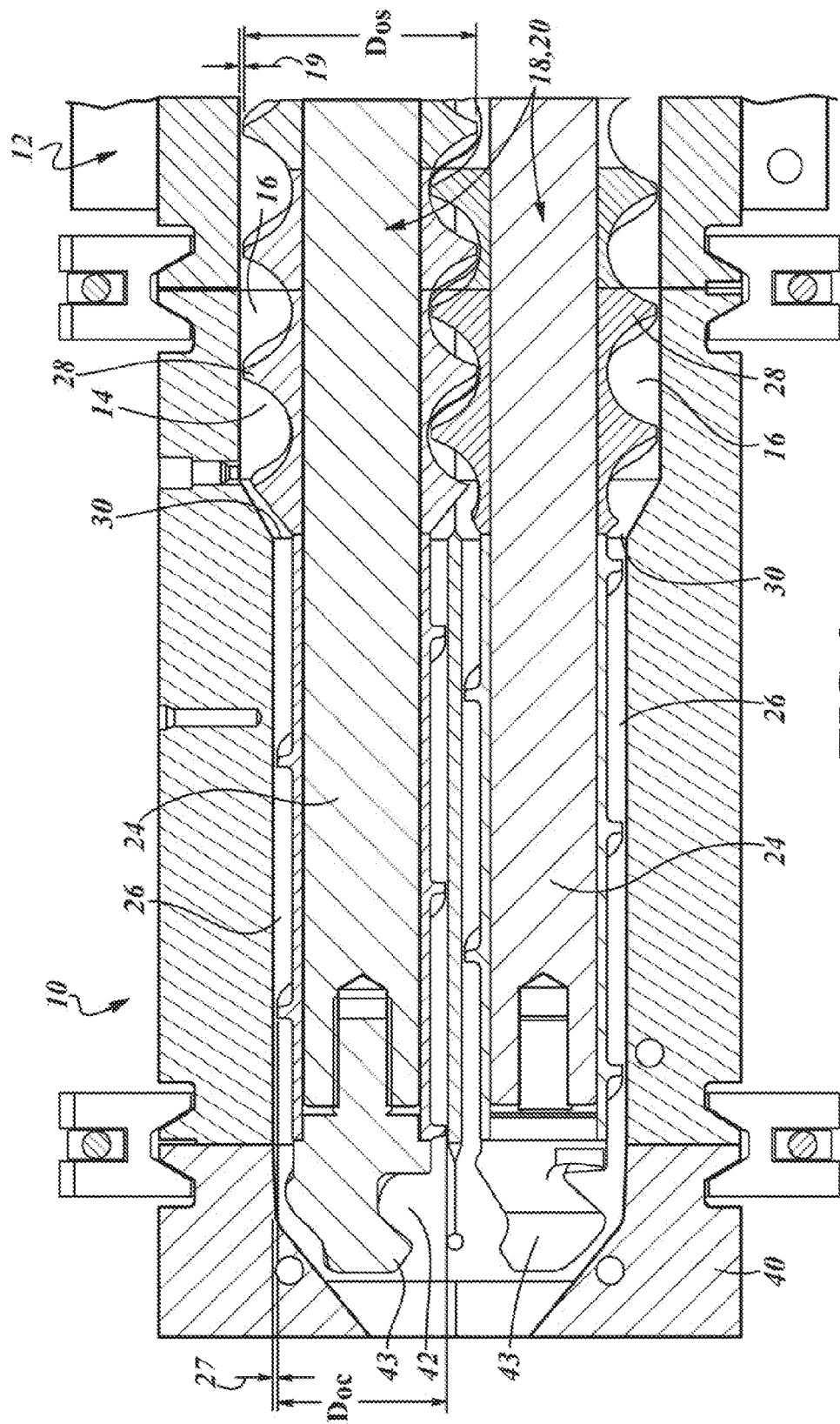
FIG. 3 is a cross-sectional top view of one end of the twin-screw extruder of FIGS. 1 and 2 showing a downstream conveying section and profile die connected to a downstream end of a mixing chamber section of the extruder.
Figure 4:
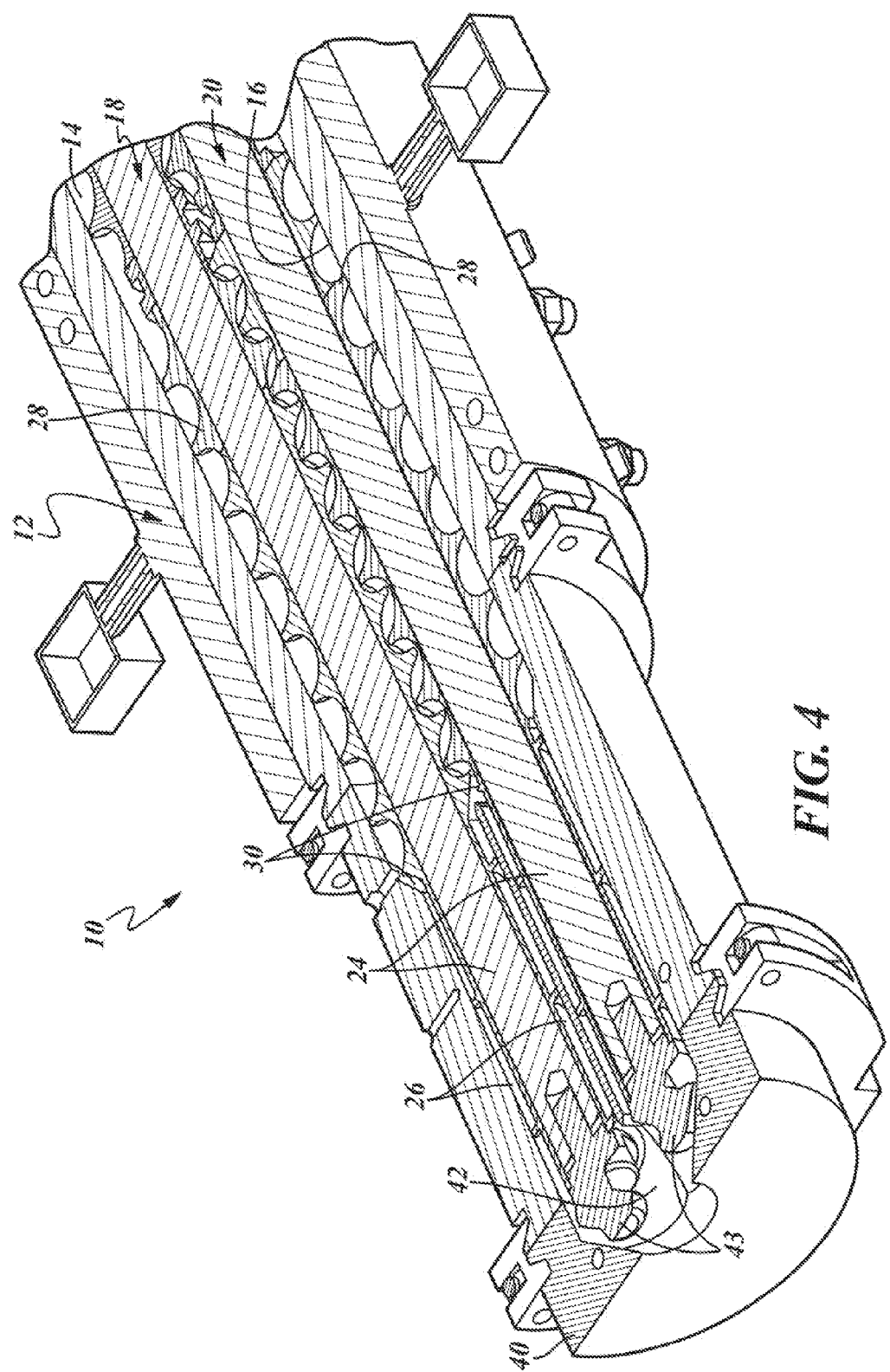
FIG. 4 is a cross-sectional perspective view of the twin-screw extruder of FIGS. 1 and 2, again showing the downstream conveying section and profile die connected to the downstream end of the mixing chamber.

The apparatus 10 can support rotation of the screw shafts 18 at rotational speeds in the range of approximately 200 to 1800 rpm. To accomplish this, the housing bores 16 and the screw sections 20 of the screw shafts 18 may be sized to have a mixing chamber screw-to-chamber wall clearance 19 in the range of approximately $D_{os}/64$ to $D_{os}/128$, where $D_{os}$=an outside diameter of the screw sections 20 as best shown in FIG. 3. The cantilevered self-journaled support of the conveying portions 24 of the screw shafts 18 within their respective separate conveying chambers 26 accommodates this range of mixing chamber screw-to-chamber wall clearances 19. $D_{os}/64$ has been determined, both through theoretical modeling and practical experience, to be the maximum allowable screw-to-chamber wall clearance that a compounding twin-screw extruder of this type can have at high rpm without encountering an unacceptably high shear rate that would be potentially detrimental to extrudate being produced.

To provide sufficient cantilevered self-journaled support of the screw shafts 18, the conveying chambers 26 and the conveying portions 24 of the screw shafts 18 may be sized to have a conveying section screw-to-chamber wall clearance 27 of less than $D_{oc}/128$, where $D_{oc}$=an outside diameter of the conveying portions 24 of the screw shafts 18 as shown in FIG. 3. In other embodiments the screw-to-chamber wall clearance in each of the conveying chambers 26 may be in the range of approximately $D_{oc}/128$ to $D_{oc}/150$. Because the conveying section screw-to-chamber wall clearance 27 is less than the mixing chamber screw-to-chamber wall clearance 19, leakage flow losses between screw crests and chamber walls are reduced. The conveying portions 24 of the screw shafts 18 may be configured for pumping and not for melting so as to provide greater flow rate at higher RPM without the significant viscous dissipation effects.

To allow for the intermeshing of the screw sections 20 of the screw shafts 18 within intersecting housing bores 16 while, at the same time, allowing for the conveying portions 24 of the screw shafts 18 to be received in separate conveying chambers 26, each screw shaft conveying portion 24 has an outer diameter smaller than an outer diameter of the screw section 20 of each screw shaft 18. The conveying portions 24 of the screw shafts 18 include helical screw flights 28 shaped to convey mixed material axially downstream from the screw shaft screw sections 20 toward a mixing chamber outlet 30 disposed axially downstream from the conveying portions 24 of the screw shafts 18.

In the present embodiment, the screw shaft screw sections 20 have a shaft center distance to screw diameter ratio of 0.775. Also, each screw shaft screw section 20 may have an outside diameter to inside diameter (OD-ID) ratio of approximately 1.78. However, in other embodiments, each screw shaft screw section 20 may have an OD-ID ratio anywhere in the range of approximately 1.4-1.8. In other embodiments, the point at which the OD-ID ratio falls within this range depends on the available torque density that a gearbox of the drive mechanism 22 provides as well as the configuration of the screw sections 20 of the screw shafts 18. Variations in the OD/ID ratio for a given screw configuration alter screw shaft and gearbox power available for mixing. In general, a lower ratio, e.g., of 1.55, is associated with a larger diameter drive shaft and generally greater available power for mixing, but lower free volume inside the mixing chamber 14. In general, a higher OD/ID ratio is associated with a slimmer drive shaft and less power capability, but higher free volume. In contrast, the conveying portions 24 of the screw shafts 18 may have an OD-ID ratio of 1.3.

Figure 5:
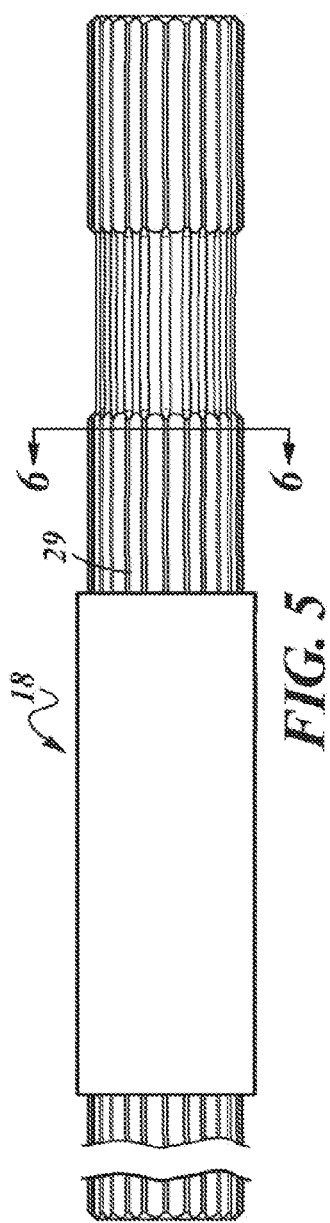
FIG. 5 is a top view of a sinusoidally splined engagement section of one of two screw shafts of the twin-screw extruder of FIGS. 1 and 2.
Figure 7:
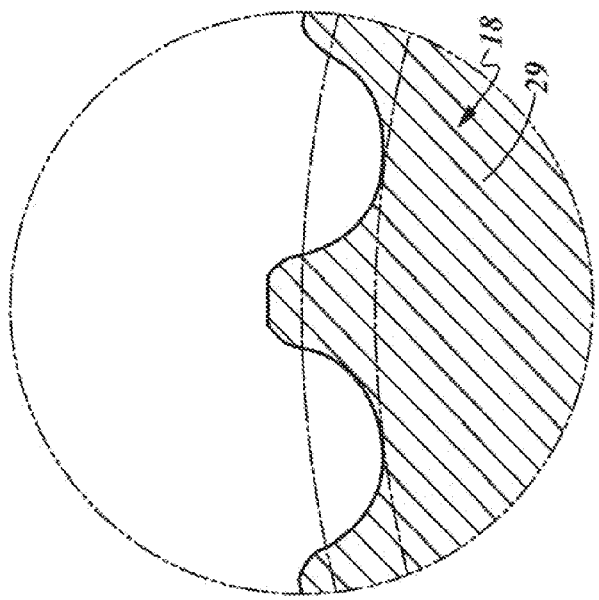
FIG. 7 is a magnified view of a portion of the screw shaft engagement section shown in circle 7 of FIG. 6.
Figure 6:
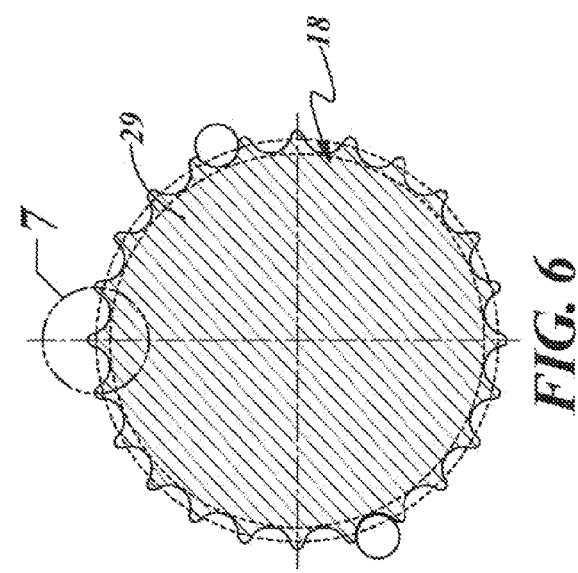
FIG. 6 is a cross-sectional end view of along the line 6-6 of FIG. 5.

The drive mechanism 22 and the screw shaft screw sections 20 of the present embodiment may operate at a torque density in excess of 11 $Nm/cm^3$. Depending on the application, the screw shaft screw sections 20 may be shaped and the drive mechanism 22 selected and/or set to develop, withstand, and operate at a torque density in the range of approximately 8.7 to 13.6 $Nm/cm^3$. As shown in FIGS. 5 and 6 the torque-carrying capability of the screw shafts 18 may be enhanced by including sinusoidally splined engagement sections 29 at the ends of the screw shafts 18 that engage the drive mechanism 22. The sinusoidally splined engagement sections 29 may include a radially outwardly extending spline array that engages a complementary radially inwardly extending spline array of the drive mechanism 22.

The torque delivery capability of the drive mechanism 22 is limited primarily the useful life of gearbox bearings of the drive mechanism 22. Operating at a torque density of approximately 8.7 $Nm/cm^3$ the gearbox bearings can be expected to last for approximately 40,000 hours. Operating at approximately 13.6 $Nm/cm^3$ of operation the bearings can be expected to last approximately 20,000 hours. In other embodiments drive mechanisms 22 and screw shaft screw sections 20 may be provided that develop and operate at any suitable torque density over a desired operating life.

What constitutes a suitable torque density is related to the OD/ID ratio of the screw shaft screw sections 20. For shallow channel depth, e.g., OD/ID=1.5, a sufficient torque density will be approximately 11 $Nm/cm^3$. For deeper channel depth, e.g., OD/ID=1.8, a sufficient torque density will be approximately 8.7 $Nm/cm^3$. Accordingly, in embodiments having OD/ID ratios in the range of approximately 1.5 to 1.8, the torque density will generally be in the range of approximately 8-11 $Nm/cm^3$. Further information on this subject is available in a paper entitled "Deeper Screw Flights 28 offer New Opportunities for Co-rotating Twin Screw Extruders" by Klaus Kapfer and Erwin Häring, Published in SPE Conference Proceedings, ANTEC 2002, San Francisco, Calif., and is incorporated herein by reference.

As shown in FIG. 1 the apparatus 10 includes a first or upstream inlet 32 that receives material into the mixing chamber 14 and may include additional downstream inlets 34 positioned to receive material into the mixing chamber 14 downstream from the upstream inlet 32 from side feeders 35 or, alternatively, to serve as degassing ports 36. Each degassing port 36 may comprise a stuffing device 37 with degassing of the material in the mixing chamber 14 being accomplished by applying a staged incremental vacuum 39 to the stuffing device 37.

The apparatus 10 may further comprise a profile die 40 supported downstream from the conveying portions 24 of the screw shafts 18. The profile die 40 may be arranged to receive mixed material discharged from the conveying chambers 26 and to form an extrudate of a desired cross-sectional shape. In other embodiments, a pelletizer may be positioned downstream from the conveying portions 24 of the screw shafts 18 in place of a profile die 40.

The apparatus 10 may further comprise a common discharge cavity 42 disposed downstream from the conveying chambers 26, in advance of the profile die 40, and in fluid communication with the conveying chambers 26. Two screw tips 43 may be disposed within the common discharge cavity 42 and supported on respective downstream ends of the screw shafts 18 for coaxial rotation with the respective screw shafts 18.

In practice, an extrudate may be formed at high screw rpm and without excessive shear heating by first fabricating a twin-screw extruder apparatus 10 that, as described above, includes a housing 12 comprising both a mixing chamber 14 comprising two parallel generally cylindrical intersecting housing bores 16, and separate conveying chambers 26 arranged generally parallel to one another downstream of the mixing chamber 14. The conveying chambers 26 and the conveying portions 24 of the screw shafts 18 may be formed to leave a conveying section screw-to-chamber wall clearance 27 in the range of approximately $D_{oc}/128$ to $D_{oc}/150$ between respective inner walls of the conveying chambers 26 and the conveying portions 24 of the screw shafts 18. The screw sections 20 of the two screw shafts 18 are then supported for co-wiping intermeshing rotation within the respective housing bores 16 of the mixing chamber 14 while the conveying portions 24 of the screw shafts 18 are supported for rotation within the separate conveying chambers 26 of the housing 12. The housing bores 16 and the screw sections 20 of the screw shafts 18 may be formed to leave a mixing chamber screw-to-chamber wall clearance 19 in the range of approximately $D_{os}/64$-$D_{os}/128$ between the inner wall of the mixing chamber 14 and the screw sections 20 of the screw shafts 18. The screw sections 20 of the screw shafts 18 may be formed to have respective outside diameter to inside diameter (OD-ID) ratios in the range of approximately 1.4-1.8. The drive mechanism 22 may then be operably attached to the screw shafts 18.

Material to be extruded may then be fed into the mixing chamber 14 and the drive mechanism 22 actuated to mixing or agitating the material by rotating the screw shafts 18 in the same direction and in the same sense at rotational speeds in the range of approximately 200 to 1800 rpm, depending on the composition of the material to be extruded. Where the material includes polymeric material fed into the mixing chamber 14 through an upstream inlet 32 and organic material fed into the mixing chamber 14 through a downstream inlet 34 disposed downstream from the upstream inlet 32, the drive mechanism 22 is actuated to rotate the screw shafts 18 in the same direction and in the same sense at rotational speeds in the range of 600 to 1500 rpm, which has been found to be an acceptable speed range for polymer compounding, while developing a torque density in the range of approximately 8-11 Nm/cm$^3$. The polymeric material may be heated to a molten state before reaching the downstream inlet 34 and before minor components are mixed into it through the downstream inlet 34 as is described in PCT/US2006/035855, which is incorporated herein by reference.

Polymeric materials fed into the mixing chamber 14 may include thermoplastic resins such as high-density polyethylene, low-density polyethylene, linear low-density polyethylene, polyvinyl chloride, and/or polypropylene. Organic materials fed into the mixing chamber 14 may include wood flour, wood pellets, wood fibers, wastepaper, kenaf, flax, rice hulls, jute, sisal, coconut, and/or hemp. Inorganic materials such as glass fibers, carbon fibers, modifiers and fillers such as calcium carbonate, talc, wollastonite, carbon black, and other additives such as antioxidants, UV stabilizers, colorants, impact modifiers, and lubricants, may also be fed into the mixing chamber 14.

The material continues to be mixed or agitated within the mixing chamber 14 as it is conveyed further downstream through the mixing chamber 14 and along the respective conveying chambers 26 by the rotation of the screw shafts 18. As it is being conveyed further downstream through the mixing chamber 14 the material may be degassed or devolatilized through one or more degassing vents downstream from the downstream inlet 34. The material may then be conveyed and merged into the discharge cavity 42 provided additional mixing and propulsion by the rotation of the screw tips 43 within the discharge cavity 42. The mixture may then be discharged axially from the discharge cavity 42 through one or more dies 40, such as may be provided as disclosed in U.S. Pat. No. 5,516,472, which is incorporated herein by reference. The material or mixture may, alternatively, be axially discharged from the discharge cavity 42 through a pelletizer.

Through self-journaled support, a twin-screw extruder may thus be constructed in such a way as to reduce shear heating in the vicinity of the screw shaft screw sections 20 by allowing for a larger mixing chamber screw-to-chamber wall clearance 19 in the mixing chamber 14.

This description, rather than describing limitations of an invention, only illustrates (an) embodiment(s) of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An extrusion apparatus for forming an extrudate, the apparatus comprising:
   a mixing chamber comprising two parallel intersecting housing bores;
   two screw shafts rotatably cantilevered for self-journaled support for rotation about respective generally parallel axes of said housing bores, said screw sections positioned for co-wiping intermeshing rotation within their respective housing bores within said mixing chamber;
   said housing bores within said mixing chamber having an outside diameter $D_{OM}$;
   a conveying chamber having said screw shafts disposed therein with conveying portions arranged generally parallel to one another downstream of the mixing chamber said conveying chamber having an outside diameter ($D_{MCO}$) and wherein $D_{OM}$ is greater than $D_{MCO}$; and
   wherein said screw shafts within said mixing chamber are sized to have a screw-to-chamber wall clearance in the range of approximately $D_{OS}/64$-$D_{OS}/128$, where $D_{OS}$=an outside diameter of the screw sections within said mixing chamber; and
   wherein said conveying chamber and the conveying portions of the screw shafts therein have a screw-to-chamber wall clearance in the conveying chamber of less than $D_{OC}/128$, where $D_{OC}$=an outside diameter of the conveying portions of the screw shafts, and
   wherein said wall clearance within said mixing chamber is greater than said wall clearance within said conveying chamber.

2. An extrusion apparatus as defined in claim 1 in which the screw-to-chamber wall clearance in each of the conveying chambers is in the range of approximately $D_{OC}/128$ to $D_{OC}/150$ where $D_{OC}$ is the outside diameter of the conveying chamber.

3. An extrusion apparatus as defined in claim 1 in which the screw sections of the screw shafts in the mixing chamber each have an outside diameter to inside diameter (OD-ID) ratio greater than 1.5.

4. An extrusion apparatus as defined in claim 1 in which screw sections of the screw shafts in the mixing chamber each have an outside diameter to inside diameter (OD-ID) ratio in the range of approximately 1.4-1.8.

5. An extrusion apparatus as defined in claim 4 in which the screw sections of the screw shafts each have an outside diameter to inside diameter ratio of approximately 1.78.

6. An extrusion apparatus as defined in claim 4 in which the screw sections of the screw shafts in the mixing chamber are configured to develop a torque density in excess of approximately 11 Nm/cm$^3$.

7. An extrusion apparatus as defined in claim 4 in which the screw sections of the screw shafts in the mixing chamber are configured to develop a torque density in the range of approximately 8.7-13.6 Nm/cm$^3$.

8. An extrusion apparatus as defined in claim 7 in which the screw shafts in the mixing chamber include engagement sections having sinusoidal spline configurations configured to engage complementary receptacles of a drive mechanism.

9. An extrusion apparatus as defined in claim 1 and further including: a first inlet configured and positioned to receive material into the mixing chamber; and a second inlet positioned to receive material into the mixing chamber downstream from the first inlet.

10. An extrusion apparatus as defined in claim 9 and further including a degassing port disposed downstream from the second inlet.

* * * * *